(12) United States Patent
Morgan et al.

(10) Patent No.: US 10,160,900 B2
(45) Date of Patent: Dec. 25, 2018

(54) METHOD OF USING COMBINED SET-DELAYED CEMENT COMPOSITIONS

(71) Applicant: Halliburton Energy Services, Inc., Houston, TX (US)

(72) Inventors: Ronnie Glen Morgan, Waurika, OK (US); Kyriacos Agapiou, Houston, TX (US); Thomas Jason Pisklak, Cypress, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/500,428

(22) PCT Filed: Sep. 30, 2014

(86) PCT No.: PCT/US2014/058426
§ 371 (c)(1),
(2) Date: Jan. 30, 2017

(87) PCT Pub. No.: WO2016/053319
PCT Pub. Date: Apr. 7, 2016

(65) Prior Publication Data
US 2017/0306213 A1    Oct. 26, 2017

(51) Int. Cl.
*E21B 33/14*    (2006.01)
*E21B 33/13*    (2006.01)
(Continued)

(52) U.S. Cl.
CPC ............... *C09K 8/48* (2013.01); *C04B 28/04* (2013.01); *C04B 28/06* (2013.01); *C04B 28/18* (2013.01);
(Continued)

(58) Field of Classification Search
CPC ........ E21B 33/14; E21B 33/13; E21B 33/138; C09K 8/467; C09K 8/46; C04B 28/02
See application file for complete search history.

(56) References Cited

U.S. PATENT DOCUMENTS 4,028,125 A * 6/1977 Martin ................ C04B 28/14
                                                  106/717
4,190,454 A   2/1980 Yamagisi et al.
(Continued)

FOREIGN PATENT DOCUMENTS

EP    241230    10/1987
EP    716189    6/1996
(Continued)

OTHER PUBLICATIONS

International Search Report and Written Opinion for International Application No. PCT/US2014/058426 dated May 20, 2015.
(Continued)

*Primary Examiner* — Catherine Loikith
(74) *Attorney, Agent, or Firm* — Craig Roddy; Tumey L.L.P.

(57) ABSTRACT

Methods of using the set-delayed cement slurries and compositions resulting from the combination of the set-delayed cement slurries are also described. A method may comprise providing a first set-delayed cement slurry comprising a pozzolanic cement and/or a Portland cement, water, and a first cement set retarder; providing a second set-delayed cement slurry comprising calcium-aluminate and a second cement set retarder; mixing the first slurry and the second slurry to form a cement composition; and allowing the cement composition to set.

20 Claims, 2 Drawing Sheets

(51) Int. Cl.

| | |
|---|---|
| *C04B 28/02* | (2006.01) |
| *C09K 8/467* | (2006.01) |
| *C09K 8/46* | (2006.01) |
| *C09K 8/48* | (2006.01) |
| *C04B 28/04* | (2006.01) |
| *C04B 28/06* | (2006.01) |
| *C04B 28/18* | (2006.01) |
| *C04B 103/22* | (2006.01) |
| *C04B 103/40* | (2006.01) |

(52) U.S. Cl.
CPC ............ *C09K 8/467* (2013.01); *E21B 33/14* (2013.01); *C04B 2103/22* (2013.01); *C04B 2103/408* (2013.01); *C04B 2201/50* (2013.01); *Y02W 30/92* (2015.05); *Y02W 30/94* (2015.05)

(56) References Cited

U.S. PATENT DOCUMENTS

| | | |
|---|---|---|
| 7,326,290 B2 | 2/2008 | Guinot et al. |
| 7,691,198 B2 * | 4/2010 | Van Deventer ....... B28C 7/0418 106/600 |
| 8,720,563 B2 | 5/2014 | Joseph et al. |
| 8,851,173 B2 | 10/2014 | Brothers et al. |
| 9,255,031 B2 | 2/2016 | Pisklak et al. |
| 9,255,454 B2 | 2/2016 | Lewis et al. |
| 9,260,343 B2 | 2/2016 | Brothers et al. |
| 9,328,281 B2 | 5/2016 | Agapiou et al. |
| 9,328,583 B2 | 5/2016 | Pisklak et al. |
| 9,371,712 B2 | 6/2016 | Boul et al. |
| 2010/0175589 A1 | 7/2010 | Charpentier et al. |
| 2010/0240556 A1 | 9/2010 | Keys et al. |
| 2012/0103609 A1 | 5/2012 | Khatri et al. |
| 2013/0041068 A1* | 2/2013 | Reddy .................... C04B 28/02 523/130 |
| 2014/0034314 A1 | 2/2014 | Lewis et al. |

FOREIGN PATENT DOCUMENTS

| | | |
|---|---|---|
| FR | 2918055 | 1/2009 |
| WO | 2013189977 | 12/2013 |

OTHER PUBLICATIONS

Pozmix® A Cement, Halliburton Brochure, 2007.
Daxad® 19 Dispersant, GEO® Specialty Chemicals Product Bulletin, Aug. 15, 2013.
Global Oilfield Solutions: Dispersants for Oilwell Cementing: Liquiment®, BASF Brochure, Jul. 2015.
Construction: Ethacryl™ G Polycarboxylate Ether, COATEX Brochure, Nov. 19, 2015.
Cementing: CFR™ Cement Friction Reducer, Halliburton Brochure, 2005.
ZoneSealant™ 2000, Halliburton Material Safety Data Sheet, May 14, 2013.
Extended European Search Report for Application No. 14902962.1 published Feb. 2, 2018.

* cited by examiner

METHOD OF USING COMBINED SET-DELAYED CEMENT COMPOSITIONS

BACKGROUND

Set-delayed cement slurries and, more particularly, compositions resulting from a combination of the set-delayed cement slurries are provided. Additionally, methods of using the set-delayed cement slurries and compositions resulting from the combination of the set-delayed cement slurries are also described.

Cement compositions may be used in a variety of subterranean operations. For example, in subterranean well construction, a pipe string (e.g., casing, liners, expandable tubulars, etc.) may be run into a wellbore and cemented in place. The process of cementing the pipe string in place is commonly referred to as "primary cementing." In a typical primary cementing method, a cement composition may be pumped into an annulus between the walls of the wellbore and the exterior surface of the pipe string disposed therein. The cement composition may set in the annular space, thereby forming an annular sheath of hardened, substantially impermeable cement (i.e. a cement sheath) that may support and position the pipe string in the wellbore and may bond the exterior surface of the pipe string to the subterranean formation. Among other things, the cement sheath surrounding the pipe string prevents the migration of fluids in the annulus and protects the pipe string from corrosion. Cement compositions may also be used in remedial cementing methods to seal cracks or holes in pipe strings or cement sheaths, to seal highly permeable formation zones or fractures, or to place a cement plug and the like.

A broad variety of cement compositions have been used in subterranean cementing operations. In some instances, set-delayed cement compositions have been used. Set-delayed cement compositions are characterized by being capable of remaining in a pumpable fluid state for at least about one day (e.g., about 7 days, about 2 weeks, about 2 years or more) at room temperature (e.g., about 80° F.) in quiescent storage. When desired for use, the set-delayed cement compositions should be capable of activation and consequently develop reasonable compressive strengths. For example, a set-delayed cement composition that is activated may set into a hardened mass. Among other things, set-delayed cement compositions may be suitable for use in wellbore applications such as applications where it is desirable to prepare the cement composition in advance. This may allow the cement composition to be stored prior to use. In addition, this may allow the cement composition to be prepared at a convenient location before transportation to the job site. Accordingly, capital expenditures may be reduced due to a reduction in the need for on-site bulk storage and mixing equipment. This may be particularly useful for offshore cementing operations where space onboard the vessels may be limited.

While set-delayed cement compositions have been developed heretofore, challenges exist with their successful use in subterranean cementing operations. For example, some set-delayed compositions may have limited use at lower temperatures as they may not develop sufficient compressive strength when used in subterranean formations having lower bottom hole static temperatures. In addition, it may be problematic to activate some set-delayed cement compositions while maintaining acceptable thickening times and compressive strength development.

BRIEF DESCRIPTION OF THE DRAWINGS

These drawings illustrate certain aspects of some of the embodiments of the present method, and should not be used to limit or define the method.

DESCRIPTION OF PREFERRED EMBODIMENTS

Set-delayed cement slurries and, more particularly, compositions resulting from a combination of the set-delayed cement slurries are provided. Additionally, methods of using the set-delayed cement slurries and compositions resulting from the combination of the set-delayed cement slurries are also described.

As used herein, the combined set-delayed cement compositions may comprise at least two separate set-delayed cement slurries with one component slurry comprising Portland cement, a pozzolanic cement (e.g., pumice), or a combination thereof, and the other component slurry comprising a calcium aluminate cement. Each component slurry may also comprise water, a cement set retarder, and optionally, a dispersant. Advantageously, the set-delayed cement slurries may be capable of remaining in a pumpable fluid state for an extended period of time, i.e. they may be capable of remaining in a pumpable fluid state for at least about one day (e.g., about 7 days, about 2 weeks, about 2 years or more) at room temperature (e.g., about 80° F.) in quiescent storage. Generally, the combined set-delayed cement compositions develop compressive strength after the component slurries are combined. Advantageously, the combined set-delayed cement compositions may develop reasonable compressive strengths at relatively low temperatures (e.g., temperatures of about 70° F. or less to about 140° F.). Thus, while the combined set-delayed cement compositions may be suitable for a number of subterranean cementing operations, they may be particularly suitable for use in subterranean formations having relatively low bottom hole static temperatures, e.g., temperatures of about 70° F. or less to about 140° F. Alternatively, the combined set-delayed cement compositions may be used in subterranean formations having bottom hole static temperatures up to 450° F. or higher.

As used herein, the term "slurry A" will be used to describe the set-delayed cement slurry comprising a Portland cement, a pozzolanic cement, or a combination thereof. Although the letter "A" is used in this disclosure to designate the set-delayed cement slurry comprising a Portland cement, a pozzolanic cement, or a combination thereof; the letter "A" does not describe, either explicitly or implicitly, any information as to the order in which the two component set-delayed cement slurries are to be mixed. The two set-delayed cement slurries may be mixed in any order, and the letter "A" merely designates the first of the individual set-delayed cement slurries to be described for the purposes of this disclosure.

Slurry A may comprise a pozzolanic cement. Any pozzolanic cement is suitable for use. Without limitation, examples of pozzolanic cements may include fly ash, silica fume, metakaolin, a natural pozzolan (e.g., pumice), or combinations thereof. For some applications, the cementitious components present in slurry A may consist essentially of the pozzolanic cement. For example, the cementitious components may primarily comprise the pozzolanic cement without any additional cementitious components (e.g., Portland cement) that hydraulically set in the presence of water. Alternatively, for some applications, the cementitious components present in slurry A may comprise a pozzolanic cement and Portland cement. Where present, the pozzolanic cement may be included in Slurry A in an amount in the range of from about 30% to about 70% by weight of Slurry A. For example, the pozzolanic cement may be present in an amount ranging between any of and/or including any of about 30%, about 35%, about 40%, about 45%, about 50%, about 55%, or about 60% by weight of Slurry A. One of ordinary skill in the art, with the benefit of this disclosure, should recognize the appropriate amount of pozzolanic cement to include for a chosen application.

A variety of fly ashes may be suitable for use as a pozzolanic cement, including fly ash classified as Class C and Class F fly ash according to American Petroleum Institute, API Specification for Materials and Testing for Well Cements, API Specification 10, Fifth Ed., Jul. 1, 1990. Class C fly ash comprises both silica and lime, so it may set to form a hardened mass upon mixing with water. Class F fly ash generally does not contain a sufficient amount of lime to induce a cementitious reaction, therefore, an additional source of calcium ions is necessary for a set-delayed cement composition comprising Class F fly ash. In some embodiments, lime may be mixed with Class F fly ash in an amount in the range of about 0.1% to about 100% by weight of the fly ash. In some instances, the lime may be hydrated lime. Suitable examples of fly ash include, but are not limited to, POZMIX® A cement additive, commercially available from Halliburton Energy Services, Inc., Houston, Tex.

Any metakaolin may be suitable for use as a pozzolanic cement. Generally, metakaolin is a white pozzolan that may be prepared by heating kaolin clay, for example, to temperatures in the range of about 600° C. to about 800° C.

Any natural pozzolan may be suitable for use as a pozzolanic cement. Natural pozzolanic cements are generally present on the Earth's surface and set and harden in the presence of hydrated lime and water. Without limitation, examples include pumice, diatomaceous earth, volcanic ash, opaline shale, tuff, and combinations thereof. The natural pozzolans may be ground or unground. Generally, the natural pozzolans may have any particle size distribution as desired for a particular application. The natural pozzolans may have a mean particle size in a range of from about 1 micron to about 200 microns. The mean particle size corresponds to d50 values as measured by particle size analyzers such as those manufactured by Malvern Instruments, Worcestershire, United Kingdom. In specific examples, the natural pozzolans may have a mean particle size in a range of from about 1 micron to about 200 microns, from about 5 microns to about 100 microns, or from about 10 micron to about 50 microns. In one particular example, the natural pozzolans may have a mean particle size of less than about 15 microns. An example of a suitable commercial natural pozzolan is a pumice available from Hess Pumice Products, Inc., Malad, Id., as DS-325 lightweight aggregate, which has a particle size of less than about 15 microns. It should be noted that particle sizes too small may have mixability problems while particle sizes too large may not be effectively suspended in the compositions and may be less reactive due to their decreased surface area. One of ordinary skill in the art, with the benefit of this disclosure, should be able to select a particle size for the natural pozzolans suitable for use for a chosen application.

Slurry A may comprise hydrated lime. As used herein, the tem' "hydrated lime" will be understood to mean calcium hydroxide. In some embodiments, the hydrated lime may be provided as quicklime (calcium oxide) which hydrates when mixed with water to form the hydrated lime. The hydrated lime may be included, for example, to form a hydraulic composition with the pozzolanic cement. For example, the hydrated lime may be included in a pozzolan-to-hydrated-lime weight ratio of about 10:1 to about 1:1 or a ratio of about 3:1 to about 5:1. Where present, the hydrated lime may be included in Slurry A in an amount in the range of from about 10% to about 100% by weight of the pozzolanic cement. For example, the hydrated lime may be present in an amount ranging between any of and/or including any of about 10%, about 20%, about 40%, about 60%, about 80%, or about 100% by weight of the pozzolanic cement. One of ordinary skill in the art, with the benefit of this disclosure, should recognize the appropriate amount of hydrated lime to include for a chosen application.

Slurry A may comprise a Portland cement. Examples of such Portland cements, include, but are not limited to, Classes A. C, H, or G cements according to the American Petroleum Institute, *API Specification for Materials and Testing for Well Cements*, API Specification 10, Fifth Ed., Jul. 1, 1990. In addition, the Portland cement may include Portland cements classified as ASTM Type I, II, III, IV, or V. For some applications, the cementitious components present in slurry A may consist essentially of the Portland cement. For example, the cementitious components may primarily comprise the Portland cement without any additional cementitious components (e.g., a pozzolanic cement) that hydraulically set in the presence of water. Alternatively, for some applications, the cementitious components present in slurry A may comprise a Portland cement and a pozzolanic cement. Where present, the Portland cement may be included in Slurry A in an amount in the range of from about 40% to about 75% by weight of Slurry A. For example, the pozzolanic cement may be present in an amount ranging between any of and/or including any of about 40%, about 45%, about 50%, about 55%, about 60%, about 65%, about 70%, or about 67% by weight of Slurry A. One of ordinary skill in the art, with the benefit of this disclosure, should recognize the appropriate amount of Portland cement to include for a chosen application.

Slurry A may further comprise a cement set retarder. A broad variety of cement set retarders may be suitable for use. For example, the cement set retarder may comprise phosphonic acids, such as ethylenediamine tetra(methylene phosphonic acid), diethylenetriamine penta(methylene phosphonic acid), etc.; lignosulfonates, such as sodium lignosulfonate, calcium lignosulfonate, etc.; salts such as stannous sulfate, lead acetate, monobasic calcium phosphate, organic acids, such as citric acid, tartaric acid, etc.; cellulose derivatives such as hydroxyl ethyl cellulose (HEC) and carboxymethyl hydroxyethyl cellulose (CMHEC); synthetic co- or ter-polymers comprising sulfonate and carboxylic acid groups such as sulfonate-functionalized acrylamide-acrylic acid co-polymers; borate compounds such as alkali borates, sodium metaborate, sodium tetraborate, potassium pentaborate; derivatives thereof, or mixtures thereof. Examples of suitable cement set retarders include, among others, phosphonic acid derivatives. One example of a suitable cement set retarder is Micro Matrix® cement retarder, available from Halliburton Energy Services, Inc., Houston, Tex. Generally, the cement set retarder may be present in slurry A in an amount sufficient to delay the setting for a desired time. The cement set retarder may be present in slurry A in an amount in the range of from about 0.01% to about 10% by weight of the cement (i.e. the Portland cement and/or the pozzolanic cement). More particularly, the cement set retarder may be present in an amount ranging between any of and/or including any of about 0.01%, about 0.1%, about 1%, about 2%, about 4%, about 6%, about 8%, or about 10% by weight of the cement. Additionally, it is important to use cement set retarders that do not undesirably affect the other set-delayed cement slurry when slurry A is combined with the other set-delayed cement slurry. One of ordinary skill in the art, with the benefit of this disclosure, should recognize the appropriate amount of the cement set retarder to include for a chosen application.

As used herein, the term "slurry B" will be used to describe the set-delayed cement slurry comprising a calcium-aluminate. Although the letter "B" is used in this disclosure to designate the set-delayed cement slurry comprising a calcium-aluminate; the letter "B" does not describe, either explicitly or implicitly, any information as to the order in which the two component set-delayed cement slurries are to be mixed. The two set-delayed cement slurries may be mixed in any order, and the letter "B" merely designates the order in which the individual set-delayed cement slurries are described for the purposes of this disclosure.

Slurry B may comprise a calcium-aluminate cement. Any calcium-aluminate cement is suitable for use. Calcium-aluminate cements may be described as cements that comprise calcium-aluminates in an amount greater than 50% by weight of the dry cement (i.e. the cement before water or any additives are added). Calcium-aluminates may be defined as any calcium aluminates including, but not limited to, monocalcium aluminate, monocalcium dialuminate, tricalcium aluminate, dodecacalcium hepta-aluminate, monocalcium hexa-aluminate, dicalcium aluminate, pentacalcium trialuminate, tetracalcium trialuminate, and the like. Where present, the calcium-aluminate cement may be included in Slurry B in an amount in the range of from about 40% to about 70% by weight of Slurry B. For example, the calcium aluminate cement may be present in an amount ranging between any of and/or including any of about 40%, about 45%, about 50%, about 55%, about 60%, about 65%, or about 70% by weight of Slurry B. One of ordinary skill in the art, with the benefit of this disclosure, should recognize the appropriate amount of calcium-aluminate cement to include for a chosen application.

Slurry B may comprise a cement set retarder. The cement set retarder used for slurry B may comprise a different cement set retarder than used in slurry A due to the different chemistry of calcium-aluminate cements. For example, the cement set retarder for slurry B may comprise hydroxycarboxylic acids such as citric, tartaric, gluconic acids or their respective salts, boric acid or its respective salt, and combinations thereof. A specific example of a suitable cement set retarder is Fe-2™ Iron Sequestering Agent available from Halliburton Energy Services, Inc., Houston, Tex. Generally, the cement set retarder may be present in slurry B in an amount sufficient to delay the setting for a desired time. The cement set retarder may be present in slurry B in an amount in the range of from about 0.01% to about 10% by weight of the cement (i.e. the calcium-aluminate cement). More particularly, the cement set retarder may be present in an amount ranging between any of and/or including any of about 0.01%, about 0.1%, about 1%, about 2%, about 4%, about 6%, about 8%, or about 10% by weight of the cement. Additionally, it is important to use cement set retarders that do not undesirably affect slurry A when slurry B is combined with slurry A. One of ordinary skill in the art, with the benefit of this disclosure, should recognize the appropriate amount of the cement set retarder to include for a chosen application.

The slurry B may optionally comprise a filler material. The filler material used for the slurry B may comprise any suitable filler material provided it does not raise the alkalinity of slurry B as this may induce the setting of slurry B. For example, the filler material for slurry B may comprise silica, sand, fly ash, or silica fume. Generally, the filler material may be present in slurry B in an amount sufficient to make the system economically competitive. The filler material may be present in slurry B in an amount in the range of from about 0.01% to about 100% by weight of the cement (i.e. the calcium-aluminate cement). More particularly, the filler material may be present in an amount ranging between any of and/or including any of about 0.01%, about 0.1%, about 1%, about 10%, about 25%, about 50%, about 75%, or about 100% by weight of the cement. One of ordinary skill in the art, with the benefit of this disclosure, should recognize the appropriate amount of filler material to include for a chosen application.

The set-delayed cement slurries may comprise water. The water may be from any source provided that it does not contain an excess of compounds that may undesirably affect other components in the set-delayed cement slurries, for example, for slurry B it may be important that the water not raise the alkalinity of the slurry. The water may comprise fresh water or salt water. Salt water generally may include one or more dissolved salts therein and may be saturated or unsaturated as desired for a particular application. Seawater or brines may be suitable for use in some applications. Further, the water may be present in an amount sufficient to form a pumpable slurry. In certain embodiments, the water may be present in the set-delayed cement slurries in an amount in the range of from about 33% to about 200% by weight of the cement (i.e., the weight of the pozzolanic cement and/or Portland cement for slurry A, and the weight of the calcium-aluminate cement for slurry B). In certain embodiments, the water may be present in the set-delayed cement slurries in an amount in the range of from about 35% to about 70% by weight of the cement. With the benefit of this disclosure one of ordinary skill in the art should recognize the appropriate amount of water for a chosen application.

As previously mentioned, the set-delayed cement slurries may optionally comprise a dispersant. Examples of suitable dispersants may include, without limitation, sulfonated-formaldehyde-based dispersants (e.g., sulfonated acetone formaldehyde condensate), examples of which may include Daxad® 19 dispersant available from Geo Specialty Chemicals, Ambler, Pa. Additionally, polyoxyethylene phosphonates and polyox polycarboxylates may be used. Other suitable dispersants may be polycarboxylated ether dispersants such as Liquiment® 5581F and Liquiment® 514L dispersants available from BASF Corporation Houston, Tex.; or Ethacryl™ G dispersant available from Coatex, Genay, France. An additional example of a suitable commercially available dispersant is CFR™-3 dispersant, available from Halliburton Energy Services, Inc, Houston, Tex. The Liquiment® 514L dispersant may comprise 36% by weight of the polycarboxylated ether in water. While a variety of dispersants may be used, some dispersants may be preferred for use with certain cement set retarders. For example, if slurry A comprises a phosphonic acid derivative cement set retarder, a polycarboxylated ether dispersants may be preferable to other dispersants. Without being limited by theory, it is believed that polycarboxylated ether dispersants may synergistically interact with phosphonic acid derivative cement set retarders resulting in formation of a gel that suspends the pozzolanic cement and hydrated lime in the composition for an extended period of time. Additionally, it is important to use dispersants that do not undesirably affect either of the set-delayed cement component slurries when the two slurries are combined. Thus, it is always important to understand the effect of a dispersant on the set-delayed cement slurry it is being added to and also its effect on the chemistry of the combined set-delayed cement composition. One of ordinary skill in the art, with the benefit of this disclosure, should recognize the appropriate type of dispersant to include for a chosen application.

The dispersant may be included in the set-delayed cement slurries in an amount in the range of from about 0.01% to about 5% by weight of the cement (i.e., the weight of the pozzolanic cement and/or Portland cement for slurry A, and the weight of the calcium-aluminate cement for slurry B). More particularly, the dispersant may be present in an amount ranging between any of and/or including any of about 0.01%, about 0.1%, about 0.5%, about 1%, about 2%, about 3%, about 4%, or about 5% by weight of the cement. One of ordinary skill in the art, with the benefit of this disclosure, will recognize the appropriate amount of dispersant to include for a chosen application.

The set-delayed cement slurries may optionally comprise a lithium salt which may function as cement set accelerator when slurry A and slurry B are combined to form the combined set-delayed cement composition. Examples of suitable lithium salts include, without limitation, lithium sulfate and lithium carbonate. Without being limited by theory, it is believed that the lithium ions increase the number of nucleation sites for hydrate formation in the calcium-aluminate cement. Thus, when the calcium-aluminate cement of slurry B is activated by combination with slurry A, the presence of lithium salts in slurry A, slurry B, or both slurries may accelerate setting of the calcium-aluminate cement and consequently the cement of slurry A as well. Preferably, the lithium salt should be added only to retarded or dormant calcium-aluminate cements. Introduction of a lithium salt to a non-retarded or non-dormant calcium-aluminate cement may induce an increase in alkalinity of a certain magnitude which may cause premature setting of the calcium-aluminate cement, based on the calcium-aluminate cement used and the other components in the slurry; however, lithium salts added to retarded or dormant calcium-aluminate cements may mitigate this risk. The lithium salt may be included in the set-delayed cement slurries in an amount in the range of from about 0.01% to about 10% by weight of the cement (i.e., the weight of the pozzolanic cement and/or Portland cement for slurry A, and the weight of the calcium-aluminate cement for slurry B). More particularly, the lithium salt may be present in an amount ranging between any of and/or including any of about 0.01%, about 0.1%, about 0.5%, about 1%, about 2%, about 3%, about 4%, or about 5% by weight of the cement. One of ordinary skill in the art, with the benefit of this disclosure, should recognize the appropriate amount of lithium salt to include for a chosen application.

Other additives suitable for use in subterranean cementing operations also may be added to the set-delayed cement slurries as deemed appropriate by one of ordinary skill in the art. Examples of such additives include, but are not limited to, strength-retrogression additives, set weighting agents, lightweight additives, gas-generating additives, mechanical property enhancing additives, lost-circulation materials, defoaming agents, foaming agents, thixotropic additives, and combinations thereof. Specific examples of these, and other, additives include silica (e.g., crystalline silica, amorphous silica, fumed silica, etc.), salts, fibers, hydratable clays, shale (e.g., calcined shale, vitrified shale, etc.), microspheres, diatomaceous earth, natural pozzolan, resins, latex, combinations thereof, and the like. Other optional additives may also be included, including, but not limited to, cement kiln dust, lime kiln dust, fly ash, slag cement, shale, zeolite, metakaolin, pumice, perlite, lime, silica, rice husk ash, small-particle size cement, combinations thereof, and the like. A person having ordinary skill in the art, with the benefit of this disclosure, will be able to determine the type and amount of additive useful for a particular application and desired result.

Strength-retrogression additives may be included in set-delayed cement slurries to, for example, prevent the retrogression of strength after the combined set-delayed cement composition has been allowed to develop compressive strength. These additives may allow the cement compositions to form as intended, preventing cracks and premature failure of the cementitious composition. Examples of suitable strength-retrogression additives may include, but are not limited to, amorphous silica, coarse grain crystalline silica, fine grain crystalline silica, or a combination thereof.

Weighting agents are typically materials that weigh more than water and may be used to increase the density of the set-delayed cement slurries. By way of example, weighting agents may have a specific gravity of about 2 or higher (e.g., about 2, about 4, etc.). Examples of weighting agents that may be used include, but are not limited to, hematite, hausmannite, and barite, and combinations thereof. Specific examples of suitable weighting agents include HI-DENSE® weighting agent, available from Halliburton Energy Services, Inc.

Lightweight additives may be included in the set-delayed cement slurries to, for example, decrease the density of the set-delayed cement slurries. Examples of suitable lightweight additives include, but are not limited to, bentonite, coal, diatomaceous earth, expanded perlite, fly ash, gilsonite, hollow microspheres, low-density elastic beads, nitrogen, pozzolan-bentonite, sodium silicate, combinations thereof, or other lightweight additives known in the art.

Gas-generating additives may be included in the set-delayed cement slurries to release gas at a predetermined time, which may be beneficial to prevent gas migration from the formation through the combined set-delayed cement composition before it hardens. The generated gas may combine with or inhibit the permeation of the combined set-delayed cement composition by formation gas. Examples of suitable gas-generating additives include, but are not limited to, metal particles (e.g., aluminum powder) that react with an alkaline solution to generate a gas.

Mechanical-property-enhancing additives may be included in embodiments of the set-delayed cement slurries to, for example, ensure adequate compressive strength and long-term structural integrity. These properties can be affected by the strains, stresses, temperature, pressure, and impact effects from a subterranean environment. Examples of mechanical property enhancing additives include, but are not limited to, carbon fibers, glass fibers, metal fibers, mineral fibers, silica fibers, polymeric elastomers, and latexes.

Lost-circulation materials may be included in embodiments of the set-delayed cement slurries to, for example, help prevent the loss of fluid circulation into the subterranean formation. Examples of lost-circulation materials include but are not limited to, cedar bark, shredded cane stalks, mineral fiber, mica flakes, cellophane, calcium carbonate, ground rubber, polymeric materials, pieces of plastic, grounded marble, wood, nut hulls, plastic laminates (Formica® laminate), corncobs, and cotton hulls.

Defoaming additives may be included in the set-delayed cement slurries to, for example, reduce tendency for the set-delayed cement slurries to foam during mixing and pumping of the set-delayed cement slurries. Examples of suitable defoaming additives include, but are not limited to, polyol silicone compounds. Suitable defoaming additives are available from Halliburton Energy Services, Inc., under the product name D-AIR™ defoamers.

Foaming additives (e.g., foaming surfactants) may be included in embodiments to, for example, facilitate foaming and/or stabilize the resultant foam formed therewith. Examples of suitable foaming additives include, but are not limited to: mixtures of an ammonium salt of an alkyl ether sulfate, a cocoamidopropyl betaine surfactant, a cocoamidopropyl dimethylamine oxide surfactant, sodium chloride, and water; mixtures of an ammonium salt of an alkyl ether sulfate surfactant, a cocoamidopropyl hydroxysultaine surfactant, a cocoamidopropyl dimethylamine oxide surfactant, sodium chloride, and water; hydrolyzed keratin; mixtures of an ethoxylated alcohol ether sulfate surfactant, an alkyl or alkene amidopropyl betaine surfactant, and an alkyl or alkene dimethylamine oxide surfactant; aqueous solutions of an alpha-olefinic sulfonate surfactant and a betaine surfactant; and combinations thereof. An example of a suitable foaming additive is ZONESEALANT™ 2000 agent, available from Halliburton Energy Services, Houston, Tex.

Thixotropic additives may be included in embodiments of the set-delayed cement slurries to, for example, provide a set-delayed cement slurries that can be pumpable as a thin or low viscosity fluid, but when allowed to remain quiescent attains a relatively high viscosity. Among other things, thixotropic additives may be used to help control free water, create rapid gelation as the slurry sets, combat lost circulation, prevent "fallback" in annular column, and minimize gas migration. Examples of suitable thixotropic additives include, but are not limited to, gypsum, water soluble carboxyalkyl, hydroxyalkyl, mixed carboxyalkyl hydroxyalkyl either of cellulose, polyvalent metal salts, zirconium oxychloride with hydroxyethyl cellulose, or a combination thereof.

Those of ordinary skill in the art will appreciate that embodiments of the set-delayed cement slurries generally should have a density suitable for a particular application. By way of example, the set-delayed cement slurries may have a density in the range of from about 4 pounds per gallon ("lb/gal") to about 20 lb/gal. In certain embodiments, the set-delayed cement slurries may have a density in the range of from about 8 lb/gal to about 17 lb/gal. Embodiments of the set-delayed cement slurries may be foamed or unfoamed or may comprise other means to reduce their densities, such as hollow microspheres, low-density elastic beads, or other density-reducing additives known in the art. In embodiments, the density may be reduced after storage, but prior to placement in a subterranean formation. In embodiments, weighting additives may be used to increase the density of the set-delayed cement slurries. Examples of suitable weighting additives may include barite, hematite, hausmannite, calcium carbonate, siderite, ilmenite, or combinations thereof. In particular embodiments, the weighting additives may have a specific gravity of 3 or greater. It is to be understood that the density of the combined set-delayed cement composition is a result of the combination of the set-delayed cement slurries. Those of ordinary skill in the art, with the benefit of this disclosure, will recognize the appropriate density for a particular application.

As previously mentioned, the set-delayed cement slurries may have a delayed set in that they may be capable of remaining in a pumpable fluid state for at least one day (e.g., about 1 day, about 2 weeks, about 2 years or more) at room temperature (e.g., about 80° F.) in quiescent storage. For example, the set-delayed cement slurries may remain in a pumpable fluid state for a period of time from about 1 day to about 7 days or more. In some embodiments, the set-delayed cement slurries may remain in a pumpable fluid state for at least about 1 day, about 7 days, about 10 days, about 20 days, about 30 days, about 40 days, about 50 days, about 60 days, or longer. A fluid is considered to be in a pumpable fluid state where the fluid has a consistency of less than 70 Bearden units of consistency ("Bc"), as measured on a pressurized consistometer in accordance with the procedure for determining cement thickening times set forth in API RP Practice 10B-2, *Recommended Practice for Testing Well Cements*, First Edition, July 2005.

When desired for use, embodiments of the set-delayed cement slurries may be activated (e.g., by combination with each other) to set into a hardened mass. The term "activate", as used herein, refers to the activation of a set-delayed or heavily retarded cement slurry and may also refer to the acceleration of the setting of a set-delayed or heavily retarded cement slurry. By way of example, embodiments of the set-delayed cement slurries may be combined to form a combined set-delayed cement composition that is activated to form a hardened mass in a time period in the range of from about 1 hour to about 12 days. For example, embodiments of the combined set-delayed cement compositions may set to form a hardened mass in a time period ranging between any of and/or including any of about 1 hour, about 6 hours, about 12 hours, about 1 day, about 2 days, about 4 days, about 6 days, about 8 days, about 10 days, or about 12 days.

The set-delayed cement slurries may set to have a desirable compressive strength after combination to form the combined set-delayed cement composition. Compressive strength is generally the capacity of a material or structure to withstand axially directed pushing forces. The compressive strength may be measured at a specified time after the combination of the set-delayed cement slurries while the resultant combined set-delayed cement composition is maintained under specified temperature and pressure conditions. Compressive strength can be measured by either destructive or non-destructive methods. The destructive method physically tests the strength of treatment fluid samples at various points in time by crushing the samples in a compression-testing machine. The compressive strength is calculated from the failure load divided by the cross-sectional area resisting the load and is reported in units of pound-force per square inch (psi). Non-destructive methods may employ a UCA™ Ultrasonic Cement Analyzer, available from Fann Instrument Company, Houston, Tex. Compressive strength values may be determined in accordance with API RP 10B-2, *Recommended Practice for Testing Well Cements*, First Edition, July 2005.

By way of example, the combined set-delayed cement compositions may develop a 24-hour compressive strength in the range of from about 50 psi to about 5000 psi, alternatively, from about 100 psi to about 4500 psi, or alternatively from about 500 psi to about 4000 psi. In particular, the combined set-delayed cement compositions may develop a compressive strength in 24 hours of at least about 50 psi, at least about 100 psi, at least about 500 psi, or more. The compressive strength values may be determined using destructive or non-destructive methods at any temperature, however compressive strength development at temperatures ranging from 70° F. to 140° F. may be of particular importance for potential use in subterranean formations having relatively low bottom hole static temperatures.

In some embodiments, the combined set-delayed cement compositions may have desirable thickening times. Thickening time typically refers to the time a fluid, such as a combined set-delayed cement composition, remains in a fluid state capable of being pumped. A number of different laboratory techniques may be used to measure thickening time. A pressurized consistometer, operated in accordance with the procedure set forth in the aforementioned API RP Practice 10B-2, may be used to measure whether a fluid is in a pumpable fluid state. The thickening time may be the time for the treatment fluid to reach 70 Bc and may be reported as the time to reach 70 Bc. The set-delayed cement compositions may have thickening times greater than about 1 hour, alternatively, greater than about 2 hours, greater than about 15 hours, greater than about 30 hours, greater than about 100 hours, or alternatively greater than about 190 hours at 3,000 psi and temperatures in a range of from about 50° F. to about 400° F., alternatively, in a range of from about 70° F. to about 140° F., and alternatively at a temperature of about 100° F.

As discussed above, the set-delayed cement slurries comprise cement set retarders. However, no cement set activators are required to activate the set-delayed cement slurries once combined. Potential examples of cement set activators may include, but should not be limited to: zeolites, amines such as triethanolamine, diethanolamine; silicates such as sodium silicate; zinc formate; calcium acetate; Groups IA and IIA hydroxides such as sodium hydroxide, magnesium hydroxide, and calcium hydroxide; monovalent salts such as sodium chloride; divalent salts such as calcium chloride; nanosilica (i.e., silica having a particle size of less than or equal to about 100 nanometers); polyphosphates; and combinations thereof. This listing of cement set activators is described merely for comparative purposes to illustrate the types of cement set activators that are not required to activate the set-delayed cement slurries disclosed herein. The list is not all-inclusive, and different cement systems may require different cement set activators not listed here, yet would also not be required to activate the set-delayed cement slurries disclosed herein. However, even though the a cement set activator as described herein may not be required to activate the combined set-delayed cement composition, cement set activators may still be added at the point of mixing to further activate and/or accelerate the setting of the combined-set-delayed cement composition. Additionally, cement set activators may be added individually to Slurry A and/or Slurry B to further activate and/or accelerate the setting of the combined-set-delayed cement composition, provided that such cement set activators would not induce setting of Slurry A and/or Slurry B individually.

As discussed above the combination of slurry A with slurry B activates both of the set-delayed cement slurries without the need for exogenous cement set activators. Without being limited by theory, it is believed this may be due to the alkaline nature of slurry A removing the hydration barrier of slurry B. Further, the disassociation of the calcium aluminate in the initial phase of the setting of the calcium-aluminate cement is believed to increase the local concentration of calcium and aluminate ions enough to initiate activation of the cement(s) in slurry A. Moreover, the large exotherm associated with the setting of the calcium-aluminate cement is believed to provide a large enough temperature increase that slurry A is able to set at temperatures below its normal threshold. Thus, the combination of slurry A and slurry B produces a blended set-delayed cement composition that is capable of setting at low temperatures without the use of cement set activators.

Slurry A and slurry B may be mixed in any order and in any ratio. More particularly the ratio of slurry A to slurry B may be about 1:20, about 1:15, about 1:10, about 1:5, about 1:1, about 5:1, about 10:1, about 15:1, about 20:1. It should be noted that at lower temperatures, it may be advantageous to increase the amount of slurry B relative to slurry A. Once mixed, the combined set-delayed cement composition may be pumped downhole. Those of ordinary skill in the art, with the benefit of this disclosure, will recognize the appropriate ratio for the set-delayed cement slurries for a particular application.

As will be appreciated by those of ordinary skill in the art, the combined set-delayed cement compositions may be used in a variety of subterranean operations, including primary and remedial cementing. For example, a first slurry may be provided that comprises water, a pozzolanic cement and/or Portland cement, a cement set retarder, hydrated lime (if a pozzolanic cement is used), and optionally a dispersant. A second slurry may be provided that comprises a calcium-aluminate cement, water, a cement set retarder, and optionally a dispersant and/or a filler material. The two set-delayed cement slurries may be mixed together to form a combined set-delayed cement composition prior to being pumped downhole and may then be introduced into a subterranean formation and allowed to set therein. As used herein, introducing the combined set-delayed cement composition into a subterranean formation includes introduction into any portion of the subterranean formation, including, without limitation, into a wellbore drilled into the subterranean formation, into a near wellbore region surrounding the wellbore, or into both.

Additional applications may include storing the set-delayed cement slurries. For example, a first slurry may be provided that comprises water, a pozzolanic cement and/or Portland cement, a cement set retarder, hydrated lime (if a pozzolanic cement is used), and optionally a dispersant. A second slurry may be provided that comprises a calcium-aluminate cement, water, a cement set retarder, and optionally a dispersant and/or a filler material. The set-delayed cement slurries may be stored separately, for example, in a vessel or other suitable container. The set-delayed cement slurries may be individually stored and then combined prior to or while pumping downhole. The set-delayed cement slurries may be permitted to remain in storage for a desired time period. For example, the set-delayed cement slurries may remain in storage for a time period of about 1 day, about 2 weeks, about 2 years, or longer. For example, the set-delayed cement slurries may remain in storage for a time period of about 1 day, about 2 days, about 5 days, about 7 days, about 10 days, about 20 days, about 30 days, about 40 days, about 50 days, about 60 days, or up to about 2 years. When desired for use, the set-delayed cement slurries may be activated by combination with each other, for example, by mixing the set-delayed cement slurries (i.e. the first slurry and the second slurry) together, introducing the combined set-delayed cement composition into a subterranean formation, and allowing the set-delayed cement composition to set therein.

In primary cementing applications, for example, the combined set-delayed cement composition may be introduced into an annular space between a conduit located in a wellbore and the walls of a wellbore (and/or a larger conduit in the wellbore), wherein the wellbore penetrates the subterranean formation. The combined set-delayed cement composition may be allowed to set in the annular space to form an annular sheath of hardened cement. The combined set-delayed cement composition may form a barrier that prevents the migration of fluids in the wellbore. The combined set-delayed cement composition may also, for example, support the conduit in the wellbore.

In remedial cementing applications, a combined set-delayed cement composition may be used, for example, in squeeze-cementing operations or in the placement of cement plugs. By way of example, the combined set-delayed composition may be placed in a wellbore to plug an opening (e.g., a void or crack) in the formation, in a gravel pack, in the conduit, in the cement sheath, and/or between the cement sheath and the conduit (e.g., a microannulus).

Additional applications for slurry A may be include displacement of a prior placed fluid (i.e. the set-delayed cement slurry comprising a pozzolanic cement and/or a Portland cement may be used as a spacer fluid). Slurry A may be similar in composition to conventional spacer fluids. Because of this similarity, slurry A may be used as a spacer fluid for applications where the chemical makeup of slurry A will not have a negative impact on the makeup of the fluid to be pumped subsequently to slurry A. Slurry A may be used to displace a drilling mud, separate cement from a drilling mud, displace another treatment fluid, separate the drilling mud from a treatment fluid, and/or separate cement from a treatment fluid. Advantageously, the use of slurry A as a spacer fluid may condition the subterranean formation with part of the same composition that ultimately may be used as the annular sealant. Therefore, the risk of incompatibilities between sealant and spacer fluid may be reduced.

In applications where slurry A may be used as a spacer fluid, the density of the slurry A may be adjusted by the addition of water and/or a viscosifier. The water and viscosifiers may be added in any amount to achieve the appropriate density to provide a suitable rheological hierarchy for a given application. An example of a suitable viscosifier is SA-1015™ suspending agent available from Halliburton Energy Services, Houston, Tex. Additionally, weighting agents may be added to adjust the density as may be appropriate to maintain a suitable rheological hierarchy. One of ordinary skill in the art, with the benefit of this disclosure, will recognize the appropriate density and method of density adjustment necessary for a chosen application.

Additionally, for some spacer fluid applications, slurry A may be foamed with a foaming additive and/or a gas. The spacer fluid may be foamed, for example, to provide a spacer fluid with a reduced density. The gas used for foaming slurry A may be any suitable gas for foaming, including, but not limited to: air, nitrogen, or combinations thereof. Generally, the gas should be present in an amount sufficient to form the desired amount or quality of foam. Foaming additives may be included in embodiments to, for example, facilitate foaming and/or stabilize the resultant foam formed therewith. Examples of suitable foaming additives include, but are not limited to: mixtures of an ammonium salt of an alkyl ether sulfate, a cocoamidopropyl betaine surfactant, a cocoamidopropyl dimethylamine oxide surfactant, sodium chloride, and water; mixtures of an ammonium salt of an alkyl ether sulfate surfactant, a cocoamidopropyl hydroxysultaine surfactant, a cocoamidopropyl dimethylamine oxide surfactant, sodium chloride, and water; hydrolyzed keratin; mixtures of an ethoxylated alcohol ether sulfate surfactant, an alkyl or alkene amidopropyl betaine surfactant, and an alkyl or alkene dimethylamine oxide surfactant; aqueous solutions of an alpha-olefinic sulfonate surfactant and a betaine surfactant; and combinations thereof. An example of a suitable foaming additive is ZONESEALANT™ 2000 agent, available from Halliburton Energy Services, Houston, Tex.

It is to be understood, that any additive, component, or embodiment disclosed herein may additionally be used or combined with embodiments of slurry A that comprise a spacer fluid. For example slurry A may be used as a spacer fluid and then pumped to the surface where it may be combined with slurry B to form the combined set-delayed cement composition. Alternatively slurry A may be used to displace another fluid and then slurry B may be pumped subsequently to slurry A to mix the two set-delayed cement slurries in the wellbore and thus form the combined set-delayed cement combination in the wellbore. One of ordinary skill in the art will understand that use of slurry A as a spacer fluid will not preclude other uses of slurry A.

A method for cementing may be provided. The method may be used in conjunction with one or more of the methods, compositions, and/or systems illustrated on FIGS. 1-2B. The method may include providing a first set-delayed cement slurry comprising a pozzolanic cement and/or a Portland cement, water, and a first cement set retarder; providing a second set-delayed cement slurry comprising calcium-aluminate and a second cement set retarder; mixing the first slurry and the second slurry to form a cement composition; and allowing the cement composition to set. The cement composition may be introduced into a wellbore penetrating a subterranean formation and allowed to set within. The first set-delayed cement slurry may comprise the pozzolanic cement, wherein the pozzolanic cement is selected from the group consisting of fly ash, silica fume, metakaolin, pumice, and any combination thereof. The first set-delayed cement slurry may comprise the pozzolanic cement and lime. The cement composition may further comprise at least one dispersant selected from the group consisting of a sulfonated-formaldehyde-based dispersant, a polycarboxylated ether dispersant, and any combination thereof. At least one of the first cement set retarder or the second cement set retarder may be selected from the group consisting of a phosphonic acid, a phosphonic acid derivative, a lignosulfonate, a salt, an organic acid, a carboxymethylated hydroxyethylated cellulose, a synthetic co- or ter-polymer comprising sulfonate and carboxylic acid groups, a borate compound, and any combination thereof. At least one of the first set-delayed cement slurry or the second set-delayed cement slurry may be stored for a time period of about 1 days or longer prior to the step of mixing. At least one of the first set-delayed cement slurry or the second set-delayed cement slurry may be stored for a time period of about 7 days or longer prior to the step of mixing. At least one of the first set-delayed cement slurry or the second set-delayed cement slurry may comprise a lithium salt. The cement composition may be pumped through a feed pipe and into a wellbore annulus that is penetrating a subterranean formation. At least a portion of the first set-delayed cement slurry may be introduced into a wellbore that penetrates a subterranean formation such that the first set-delayed cement slurry displaces at least one fluid from the wellbore.

A cementing composition may be provided. The composition may be used in conjunction with one or more of the methods, compositions, and/or systems illustrated on FIGS. 1-2B. The composition may include a pozzolanic cement and/or a Portland cement, a calcium-aluminate cement, water, a first cement set retarder, and a second cement set retarder. The composition may comprise the pozzolanic cement and lime. The cement composition may comprise the pozzolanic cement; wherein the pozzolanic cement is selected from the group consisting of fly ash, silica fume, metakaolin, pumice, and any combination thereof. The cement composition may further comprise a dispersant. The dispersant may comprise at least one dispersant selected from the group consisting of a sulfonated-formaldehyde-based dispersant, a polycarboxylated ether dispersant, and any combination thereof. At least one of the first cement set retarder or the second cement set retarder may be selected from the group consisting of a phosphonic acid, a phosphonic acid derivative, a lignosulfonate, a salt, an organic acid, a carboxymethylated hydroxyethylated cellulose, a synthetic co- or ter-polymer comprising sulfonate and carboxylic acid groups, a borate compound, and any combination thereof. The cement composition may further comprise a lithium salt.

A system for cementing may be provided. The system may be used in conjunction with one or more of the methods, compositions, and/or systems illustrated on FIGS. 1-2B. The system may include a first set-delayed cement slurry comprising a pozzolanic cement and/or a Portland cement, water, and a first cement set retarder; a second set-delayed cement slurry comprising calcium-aluminate and a second cement set retarder; a first vessel capable of containing the first slurry, wherein the first vessel also comprises a first pump capable of pumping the first slurry; a second vessel capable of containing the second slurry, wherein the second vessel also comprises a second pump capable of pumping the second slurry; a line connected to the first pump and the second pump, wherein the line is capable of mixing the first set-delayed cement slurry and the second set-delayed cement slurry; and a third pump connected to the line capable of delivering the first set-delayed cement slurry and the second set-delayed cement slurry into a wellbore. The cement composition may be introduced into a wellbore penetrating a subterranean formation and allowed to set within. The first set-delayed cement slurry may comprise the pozzolanic cement, wherein the pozzolanic cement is selected from the group consisting of fly ash, silica fume, metakaolin, pumice, and any combination thereof. The first set-delayed cement slurry may comprise the pozzolanic cement and lime. The cement composition may further comprise at least one dispersant selected from the group consisting of a sulfonated-formaldehyde-based dispersant, a polycarboxylated ether dispersant, and any combination thereof. At least one of the first cement set retarder or the second cement set retarder may be selected from the group consisting of a phosphonic acid, a phosphonic acid derivative, a lignosulfonate, a salt, an organic acid, a carboxymethylated hydroxyethylated cellulose, a synthetic co- or ter-polymer comprising sulfonate and carboxylic acid groups, a borate compound, and any combination thereof. At least one of the first set-delayed cement slurry or the second set-delayed cement slurry may be stored for a time period of about 1 days or longer prior to the step of mixing. At least one of the first set-delayed cement slurry or the second set-delayed cement slurry may be stored for a time period of about 7 days or longer prior to the step of mixing. At least one of the first set-delayed cement slurry or the second set-delayed cement slurry may comprise a lithium salt. The cement composition may be pumped through a feed pipe and into a wellbore annulus that is penetrating a subterranean formation. At least a portion of the first set-delayed cement slurry may be introduced into a wellbore that penetrates a subterranean formation such that the first set-delayed cement slurry displaces at least one fluid from the wellbore.

Figure 1:
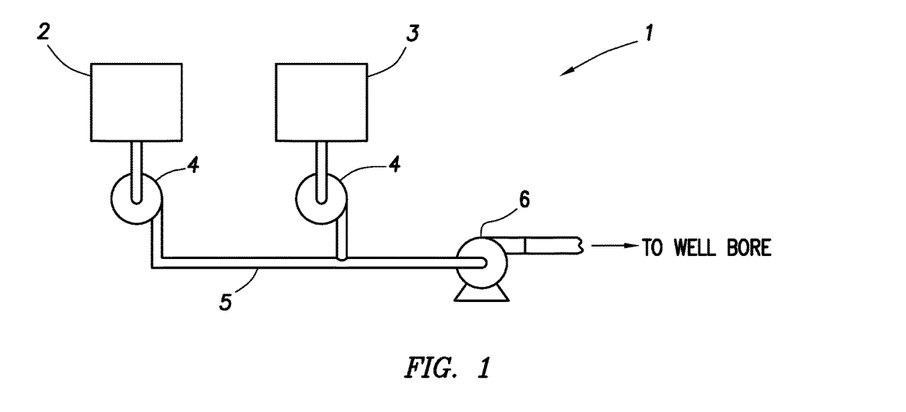
FIG. 1 illustrates a system for preparation and delivery of a combined set-delayed cement composition to a wellbore in accordance with certain embodiments.
Figure 2A:
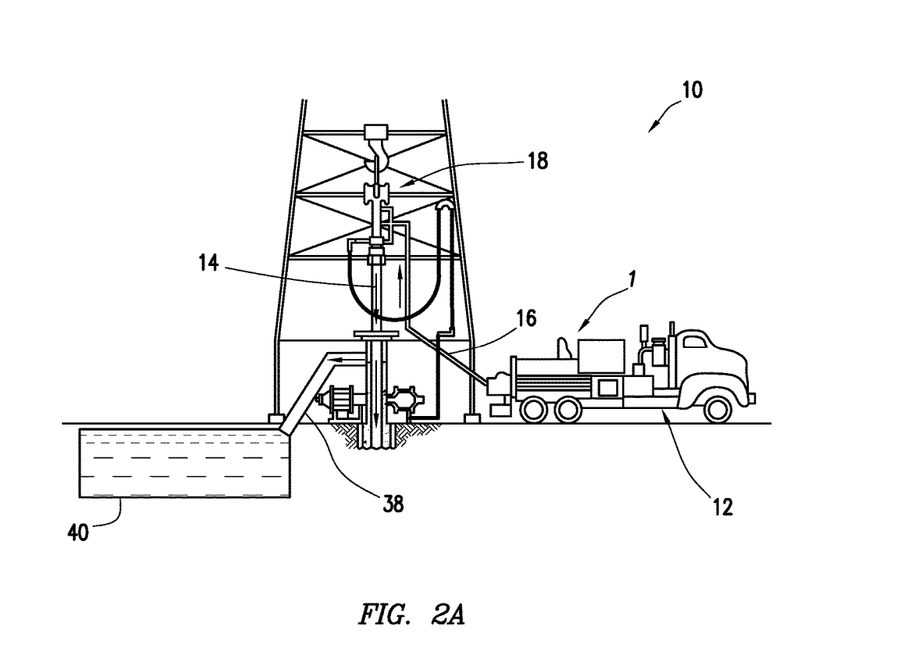
FIG. 2A illustrates surface equipment that may be used in placement of a combined set-delayed cement composition in a wellbore in accordance with certain embodiments.

Referring now to FIG. 1, preparation of a combined set-delayed cement composition will now be described. FIG. 1 illustrates a system 1 for preparation of a set-delayed cement composition and delivery to a wellbore in accordance with certain embodiments. As shown, a set-delayed cement slurry (e.g., slurry A) may be mixed in mixing equipment 2, such as a jet mixer, re-circulating mixer, or a batch mixer, for example. Another set-delayed cement slurry (e.g., slurry B) may be mixed in mixing equipment 3, such as a jet mixer, re-circulating mixer, or a batch mixer, for example. Both set-delayed cement slurries may then be pumped via pumping equipment 4 to line 5 where they are mixed in-line before being pumped to the wellbore by pumping equipment 6. In some embodiments, the mixing equipment (e.g., 2, 3, and 5) and the pumping equipment (e.g., 4 and 6) may be disposed on one or more cement trucks as will be apparent to those of ordinary skill in the art. In some applications, additional mixing equipment (e.g., a jet mixer, re-circulating mixer, and/or a batch mixer) may be used, for example, to continuously mix the set-delated cement slurries together as they are being pumped to the wellbore. Alternatively, Slurry A and/or Slurry B, may be prepared in separate vessels and then placed into mixing equipment 2 and/or mixing equipment 3 respectively, for pumping. Further alternatively, Slurry A or and/or Slurry B, may be prepared in separate vessels and then placed into a separate vessel besides mixing equipment 2 and/or mixing equipment 3 to then be mixed together and pumped into wellbore by pumping equipment 6. There is no preferred method for preparing or mixing the set-delayed cement slurries individually or together, and one having ordinary skill in the art should be readily able to mix the set-delayed cement slurries into a sufficient blend to form the combined set-delayed cement composition using the equipment on hand.

An example technique for placing a combined set-delayed cement composition into a subterranean formation will now be described with reference to FIGS. 2A and 2B. FIG. 2A illustrates surface equipment 10 that may be used in placement of a set-delayed cement composition in accordance with certain embodiments. It should be noted that while FIG. 2A generally depicts a land-based operation, those skilled in the art will readily recognize that the principles described herein are equally applicable to subsea operations that employ floating or sea-based platforms and rigs, without departing from the scope of the disclosure. As illustrated by FIG. 2A, the surface equipment 10 may include a cementing unit 12, which may include one or more cement trucks. The cementing unit 12 may include mixing equipment 2, 3, and 5, and pumping equipment 4 and 6, as shown in FIG. 1 and represented by system 1 on cement unit 12, as will be apparent to those of ordinary skill in the art. The cementing unit 12 may pump a combined set-delayed cement composition 14 through a feed pipe 16 and to a cementing head 18 which conveys the combined set-delayed cement composition 14 downhole.

Figure 2B:
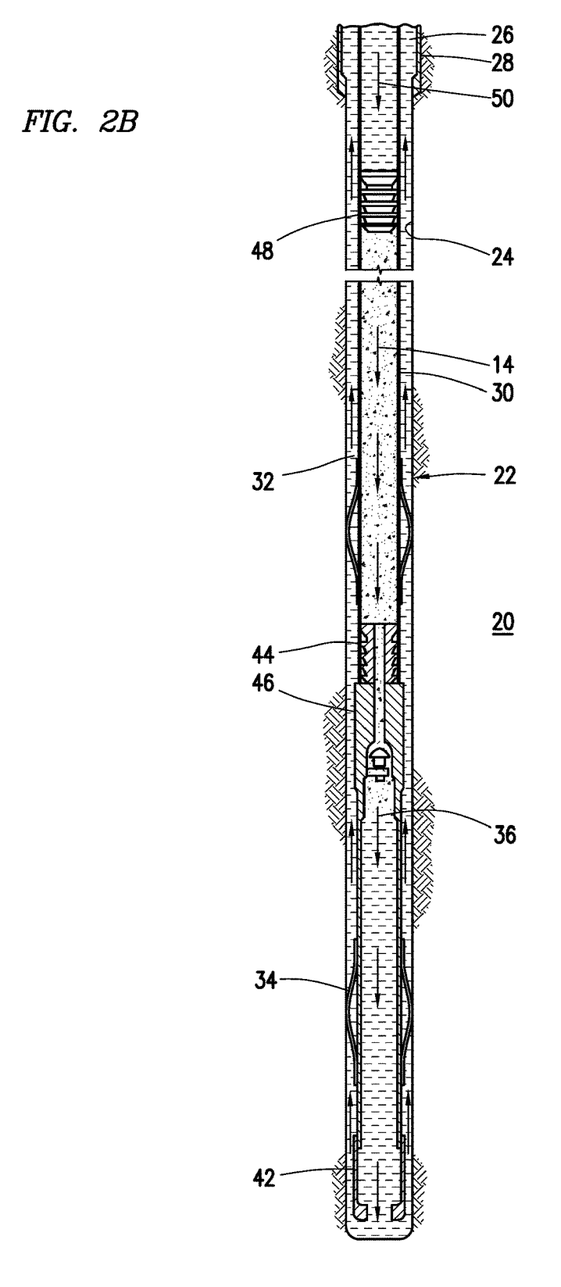
FIG. 2B illustrates placement of a combined set-delayed cement composition into a wellbore annulus in accordance with certain embodiments.

Turning now to FIG. 2B, the combined set-delayed cement composition 14 may be placed into a subterranean formation 20 in accordance with example embodiments. As illustrated, a wellbore 22 may be drilled into the subterranean formation 20. While wellbore 22 is shown extending generally vertically into the subterranean formation 20, the principles described herein are also applicable to wellbores that extend at an angle through the subterranean formation 20, such as horizontal and slanted wellbores. As illustrated, the wellbore 22 comprises walls 24. In the illustrated embodiment, a surface casing 26 has been inserted into the wellbore 22. The surface casing 26 may be cemented to the walls 24 of the wellbore 22 by cement sheath 28. In the illustrated embodiment, one or more additional conduits (e.g., intermediate casing, production casing, liners, etc.), shown here as casing 30 may also be disposed in the wellbore 22. As illustrated, there is a wellbore annulus 32 formed between the casing 30 and the walls 24 of the wellbore 22 and/or the surface casing 26. One or more centralizers 34 may be attached to the casing 30, for example, to centralize the casing 30 in the wellbore 22 prior to and during the cementing operation.

With continued reference to FIG. 2B, the combined set-delayed cement composition 14 may be pumped down the interior of the casing 30. The combined set-delayed cement composition 14 may be allowed to flow down the interior of the casing 30 through the casing shoe 42 at the bottom of the casing 30 and up around the casing 30 into the wellbore annulus 32. The combined set-delayed cement composition 14 may be allowed to set in the wellbore annulus 32, for example, to form a cement sheath that supports and positions the casing 30 in the wellbore 22. While not illustrated, other techniques may also be utilized for introduction of the combined set-delayed cement composition 14. By way of example, reverse circulation techniques may be used that include introducing the combined set-delayed cement composition 14 into the subterranean formation 20 by way of the wellbore annulus 32 instead of through the casing 30.

As it is introduced, the combined set-delayed cement composition 14 may displace other fluids 36, such as drilling fluids and/or spacer fluids that may be present in the interior of the casing 30 and/or the wellbore annulus 32. At least a portion of the displaced fluids 36 may exit the wellbore annulus 32 via a flow line 38 and be deposited, for example, in one or more retention pits 40 (e.g., a mud pit), as shown on FIG. 2A. Referring again to FIG. 2B, a bottom plug 44 may be introduced into the wellbore 22 ahead of the combined set-delayed cement composition 14, for example, to separate the combined set-delayed cement composition 14 from the fluids 36 that may be inside the casing 30 prior to cementing. After the bottom plug 44 reaches the landing collar 46, a diaphragm or other suitable device should rupture to allow the combined set-delayed cement composition 14 through the bottom plug 44. In FIG. 2B, the bottom plug 44 is shown on the landing collar 46. In the illustrated embodiment, a top plug 48 may be introduced into the wellbore 22 behind the combined set-delayed cement composition 14. The top plug 48 may separate the combined set-delayed cement composition 14 from a displacement fluid 50 and also push the combined set-delayed cement composition 14 through the bottom plug 44.

The exemplary set-delayed cement slurries and compositions disclosed herein may directly or indirectly affect one or more components or pieces of equipment associated with the preparation, delivery, recapture, recycling, reuse, and/or disposal of the disclosed set-delayed cement compositions. For example, the disclosed set-delayed cement slurries and compositions may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary set-delayed cement compositions. The disclosed set-delayed cement slurries and compositions may also directly or indirectly affect any transport or delivery equipment used to convey the set-delayed cement slurries and compositions to a well site or downhole such as, for example, any transport vessels, conduits, pipelines, trucks, tubulars, and/or pipes used to compositionally move the set-delayed cement slurries and compositions from one location to another, any pumps, compressors, or motors (e.g., topside or downhole) used to drive the set-delayed cement slurries and compositions into motion, any valves or related joints used to regulate the pressure or flow rate of the set-delayed cement slurries and compositions, and any sensors (i.e., pressure and temperature), gauges, and/or combinations thereof, and the like. The disclosed set-delayed cement slurries and compositions may also directly or indirectly affect the various downhole equipment and tools that may come into contact with the set-delayed cement slurries and compositions such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

EXAMPLES

To facilitate a better understanding of the present claims, the following examples of certain aspects of the disclosure are given. In no way should the following examples be read to limit, or define, the entire scope of the claims.

Example 1

A combined set-delayed cement composition was prepared from a Slurry A and a Slurry B. Slurry A comprised 60% BWoP (by weight of pumice) water, 100% BWoP pumice, 20% BWoP hydrated lime, 0.60% BWoP cement retarder, 1.25% BWoP cement co-retarder, 2% BWoP dispersant, 0.5% BWoP weighting agent, and 0.035% viscosifier. Slurry B comprised a 40% to 70% by weight of slurry B (BWoSB) calcium-aluminate cement, 33% to 200% BWoSB water, 1% to 3% BWoSB cement retarder, 1% to 5% BWoSB dispersant, and 0% to 10% BWoSB filler material.

Slurry A was prepared in a Waring® blender by adding all of the components and blending at a speed of 6000 rpm for 40 seconds to fully homogenize the sample. Slurry B was obtained from Kerneos, Inc., Chesapeake, Va.; as a retarded calcium-aluminate system comprising a retarded suspension of calcium-aluminate cement that was 40-70% solids. The calculated density of Slurry A was 13.6 pounds per gallon (ppg) and Slurry B was 13.5 ppg.

After preparation, the rheological properties of the samples were determined using a Model 35A Fann Viscometer and a No. 2 spring with a Fann Yield Stress Adapter (FYSA), in accordance with the procedure set forth in API RP Practice 10B-2, *Recommended Practice for Testing Well Cements*. The rheological profile of Slurry A is presented in Table 2 below. The rheological profile of slurry B is presented in Table 3 below.

TABLE 2

Slurry A Rheological Profile

| | FYSA Readings | | | | | | |
|---|---|---|---|---|---|---|---|
| | 3 | 6 | 100 | 200 | 300 | 600 | 3D | 6D |
| Day 1 | 11 | 34 | 40 | 52 | 64 | 103 | 3 | 3 |
| Day 7 | 4 | 5 | 15 | 25 | 34 | 68 | 1 | 1 |

TABLE 3

Slurry B Rheological Profile

| | FYSA Readings | | | | | | |
|---|---|---|---|---|---|---|---|
| | 3 | 6 | 100 | 200 | 300 | 600 | 3D | 6D |
| Day 1 | 20 | 23 | 49 | 63 | 75 | 114 | 7 | 4 |
| Day 48 | 19 | 22 | 47.5 | 60.5 | 72.5 | 114 | 5.5 | 5.5 |

To form the settable combined slurry, Slurry A and Slurry B were mixed together in eight varying ratios by slowly pouring the smaller portion slurry into the other while blending at 4000 rpm in a Waring® blender for one minute. The resulting AB compositions (i.e. the combined set-delayed cement compositions) were cured in 2" by 4" plastic cylinders that were placed in a water bath at 100° F. for 24 hours to form set cylinders. Then the destructive compressive strength (C.S.) was measured using a mechanical press in accordance with API RP Practice 10B-2, *Recommended Practice for Testing Well Cements*. The mix-up ratios for all 8 compositions and the results of the compressive strength testing are set forth in Table 4 and 5 below. The reported compressive strengths are an average for two cylinders of each sample. Compressive strength measurements were taken at 24 hours.

TABLE 4

Composition AB Mixup and Compressive Strength Analysis

| | Composition # | | | |
|---|---|---|---|---|
| | 1 | 2 | 3 | 4 |
| Slurry A g (%*) | 350.0 (95) | 350.0 (85) | 350.0 (75) | 350.0 (100) |
| Slurry B g (%*) | 18.5 (5) | 61.8 (15) | 116.7 (25) | 0.0 (0) |
| CS$_{24\ hr}$ at 100° F. | DNS** | 155 psi | 376 psi | DNS** |

*% = Weight percent of slurry added.
**DNS = Did not set.

TABLE 5

Composition AB Mixup and Compressive Strength Analysis Cont.

| | Composition # | | | |
|---|---|---|---|---|
| | 5 | 6 | 7 | 8 |
| Slurry A g (%*) | 18.5 (5) | 61.8 (15) | 116.7 (25) | 0.0 (0) |
| Slurry B g (%*) | 350.0 (95) | 350.0 (85) | 350.0 (75) | 350.0 (100) |
| CS$_{24\ hr}$ at 100° F. | <50 psi | 507 psi | 523 psi | DNS** |

*% = Weight percent of slurry added.
**DNS = Did not set.

The results indicate that the addition of Slurry B to Slurry A (i.e. the addition of calcium-aluminate cement to the pozzolanic cement) in progressively greater amounts resulted in progressively greater compressive strengths. Additionally, as shown by AB compositions 4 and 8, either slurry in the absence of the other will not set, and the only through the addition of a sufficient amount of one slurry with the other, is setting induced.

Example 2

Sample 3 from Example 1 above, was prepared again to record the compressive strength at an even lower temperature. The composition was cured in a 2" by 4" plastic cylinder at room temperature (70° F.) for 24 hours to form a set cylinder. Then the destructive compressive strength (C.S.) was measured using a mechanical press in accordance with API RP Practice 10B-2, *Recommended Practice for Testing Well Cements*. The reported compressive strength is an average for two cylinders. Compressive strength measurements were taken at 24 hours. The results are presented in Table 6 below.

TABLE 6

Composition AB Mixup and Compressive Strength Analysis

| | Composition # |
|---|---|
| | 3 |
| Slurry A g (%*) | 350.0 (75) |
| Slurry B g (%*) | 116.7 (25) |
| CS$_{24\ hr}$ at 70° F. | 174 psi |

*% = Weight percent of slurry added.

In comparison to Slurry A alone (i.e. composition #4 from Table 4 above), composition #3 was able to set and developed a compressive strength of 174 psi even at the lower temperature of 70° F.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, and may be modified and practiced in different but equivalent manners apparent to those skilled in the art having the benefit of the teachings herein. Although individual embodiments are discussed, the disclosure covers all combinations of all of the embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of those embodiments. If there is any conflict in the usages of a word or term in this specification and one or more patent(s) or other documents that may be incorporated herein by reference, the definitions that are consistent with this specification should be adopted.

What is claimed is:

1. A method of cementing comprising:
    providing a first set-delayed cement slurry comprising a cement selected from the group consisting of a pozzolanic cement, a Portland cement, and combinations thereof, water, and a first cement set retarder wherein the first set-delayed cement slurry is capable of remaining in a pumpable fluid state for at least about 7 days at room temperature in quiescent storage;
    providing a second set-delayed cement slurry comprising calcium-aluminate and a second cement set retarder wherein the second cement set retarder is different than the first cement set retarder and wherein the second set-delayed cement slurry is capable of remaining in a pumpable fluid state for at least about 7 days at room temperature in quiescent storage;
    mixing the first set-delayed cement slurry and the second set-delayed cement slurry to form an activated cement composition; and
    thereafter, allowing the cement composition to set to form a hardened mass.

2. The method according to claim 1 wherein the cement composition is introduced into a wellbore penetrating a subterranean formation after the step of mixing, and allowed to set within.

3. The method according to claim 1, wherein the first set-delayed cement slurry comprises the pozzolanic cement and wherein the pozzolanic cement is selected from the group consisting of fly ash, silica fume, metakaolin, pumice, and any combination thereof.

4. The method according claim 1, wherein the first set-delayed cement slurry comprises the pozzolanic cement and lime.

5. The method according to claim 1, wherein the cement composition further comprises at least one dispersant selected from the group consisting of a sulfonated-formaldehyde-based dispersant, a polycarboxylated ether dispersant, and any combination thereof.

6. The method according to claim 1, wherein at least one of the first cement set retarder or the second cement set retarder is selected from the group consisting of a phosphonic acid, a phosphonic acid derivative, a lignosulfonate, a salt, an organic acid, a carboxymethylated hydroxyethylated cellulose, a synthetic co- or ter-polymer comprising sulfonate and carboxylic acid groups, a borate compound, and any combination thereof.

7. The method according to claim 1, further comprising storing at least one of the first set-delayed cement slurry or the second set-delayed cement slurry for a time period of about 1 day or longer prior to the step of mixing.

8. The method according to claim 1, further comprising storing at least one of the first set-delayed cement slurry or the second set-delayed cement slurry for a time period of about 7 days or longer prior to the step of mixing.

9. The method according to claim 1, wherein at least one of the first set-delayed cement slurry or the second set-delayed cement slurry comprises a lithium salt.

10. The method according to claim 1, further comprising pumping the cement composition through a feed pipe and into a wellbore annulus that is penetrating a subterranean formation after the step of mixing.

11. The method according to claim 1, further comprising introducing at least a portion of the first set-delayed cement slurry into a wellbore that penetrates a subterranean formation such that the first set-delayed cement slurry displaces at least one fluid from the wellbore.

12. A method of making a cement composition, the method comprising:
    preparing a first set-delayed cement slurry comprising a cement selected from the group consisting of a pozzolanic cement, a Portland cement, and combinations thereof, water, and a first cement set retarder and storing the first set-delayed cement slurry for a period of about 1 day or longer;
    preparing a second set-delayed cement slurry comprising calcium-aluminate and a second cement set retarder and storing the second set-delayed cement slurry for a period of about 1 day or longer; and
    mixing the first set-delayed cement slurry and the second set-delayed cement slurry to form an activated cement composition.

13. The method according to claim 12, wherein the cement composition comprises the pozzolanic cement and wherein the pozzolanic cement is selected from the group consisting of fly ash, silica fume, metakaolin, pumice, and any combination thereof.

14. The method according to claim 12, wherein the cement composition further comprises a dispersant.

15. The method according to claim 14, wherein the dispersant comprises at least one dispersant selected from the group consisting of a sulfonated-formaldehyde-based dispersant, a polycarboxylated ether dispersant, and any combination thereof.

16. The method according to claim 12, wherein at least one of the first cement set retarder or the second cement set retarder is selected from the group consisting of a phosphonic acid, a phosphonic acid derivative, a lignosulfonate, a salt, an organic acid, a carboxymethylated hydroxyethylated cellulose, a synthetic co- or ter-polymer comprising sulfonate and carboxylic acid groups, a borate compound, and any combination thereof.

17. The method according to claim 12, wherein the cement composition further comprises a lithium salt.

18. A system for cementing comprising:
- a first set-delayed cement slurry comprising a cement selected from the group consisting of a pozzolanic cement, a Portland cement, and combinations thereof, water, and a first cement set retarder wherein the first set-delayed cement slurry is capable of remaining in a pumpable fluid state for a period of about 1 day or longer;
- a second set-delayed cement slurry comprising calcium-aluminate and a second cement set retarder wherein the second set-delayed cement slurry is capable of remaining in a pumpable fluid state for a period of about 1 day or longer;
- a first vessel capable of containing the first slurry, wherein the first vessel also comprises a first pump capable of pumping the first slurry;
- a second vessel capable of containing the second slurry, wherein the second vessel also comprises a second pump capable of pumping the second slurry;
- a line connected to the first pump and the second pump, wherein the line is capable of mixing the first set-delayed cement slurry and the second set-delayed cement slurry to form an activated cement composition; and
- a third pump connected to the line capable of delivering the activated cement composition into a wellbore.

19. The system according to claim 18, wherein at least one of the first cement set retarder or the second cement set retarder is selected from the group consisting of a phosphonic acid, a phosphonic acid derivative, a lignosulfonate, a salt, an organic acid, a carboxymethylated hydroxyethylated cellulose, a synthetic co- or ter-polymer comprising sulfonate and carboxylic acid groups, a borate compound, and any combination thereof.

20. The system according to claim 18, wherein at least one of the first set-delayed cement slurry or the second set-delayed cement slurry comprises a lithium salt.

* * * * *